May 31, 1927.
W. A. MOIR
1,630,714
CONDITIONING APPARATUS FOR CHOCOLATE AND THE LIKE
Filed June 11, 1925
2 Sheets-Sheet 1
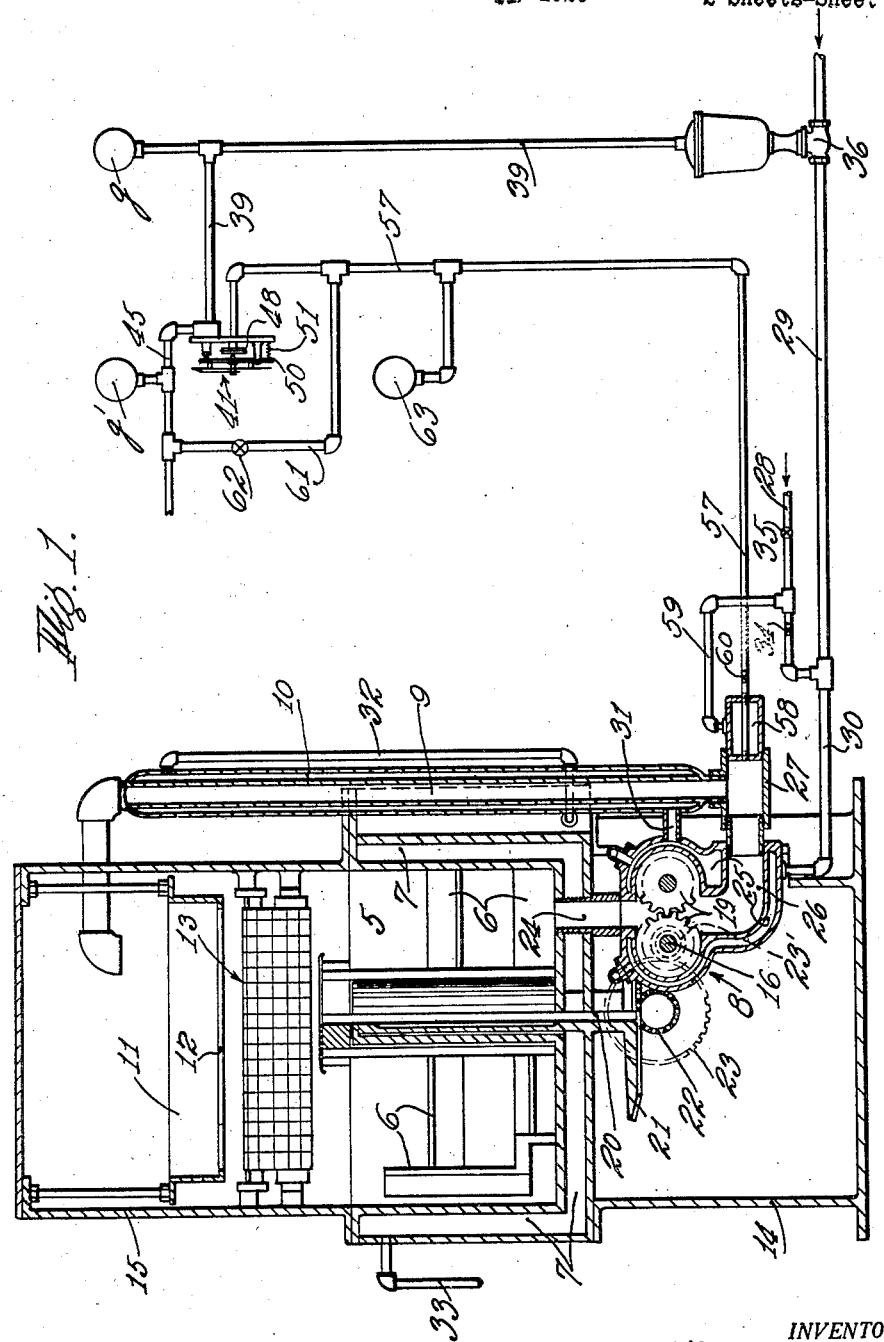
INVENTOR.
William A. Moir
BY Chapin + Neal
ATTORNEYS.

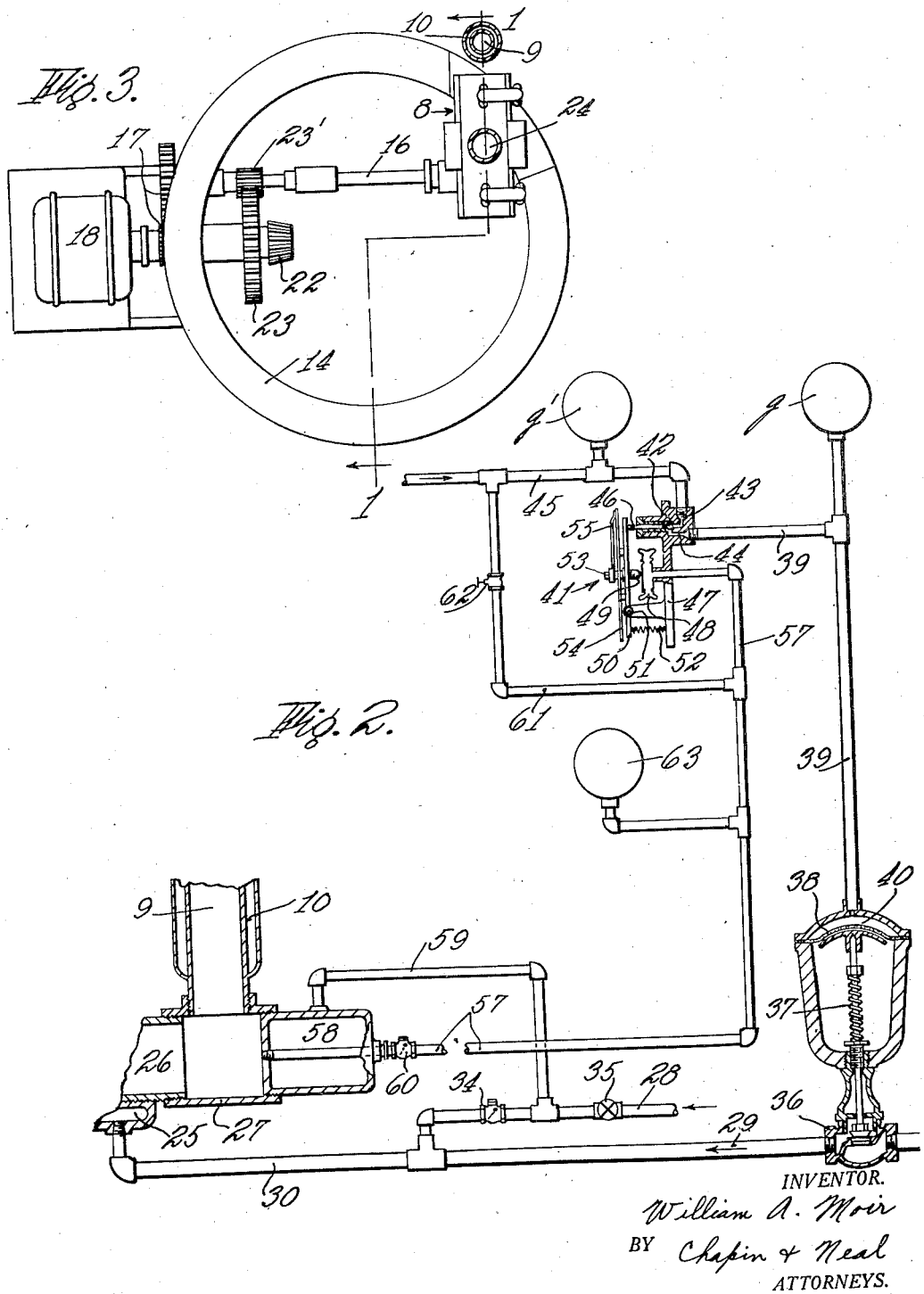

Patented May 31, 1927.

1,630,714

UNITED STATES PATENT OFFICE.

WILLIAM A. MOIR, OF HALIFAX, NOVA SCOTIA, CANADA.

CONDITIONING APPARATUS FOR CHOCOLATE AND THE LIKE.

Application filed June 11, 1925. Serial No. 36,486.

This invention relates to improvements in conditioning apparatus for chocolate and other viscous materials and has for its broad object the provision of means whereby the chocolate, or other viscous material, may be maintained within close limits at a uniform viscosity.

The invention is such that it may, with minor changes in detail, be used quite generally. It is, however, particularly useful in the candy making art, wherever it is desired to maintain the confectionery material at a substantially uniform viscosity. Its most useful field of service, however, is in connection with the conditioning of chocolate and in this particular field it finds a most advantageous specific use as an adjunct to the well known chocolate coating machine.

Such machines include a chocolate supply tank, which is really a conditioning kettle. The latter is substantially the same as the chocolate conditioning kettles used separately, as such, in candy factories and entirely apart from coating machines. These tanks or kettles, in either case, are provided with conditioning means, which usually consist of a stirring device to keep the ingredients of the chocolate thoroughly mixed and a heating jacket to control the temperature of the chocolate. It is well known that it is essential to maintain the chocolate in a coating machine, within close limits, at a predetermined condition and heretofore attempts have been made to maintain the desired condition by temperature regulation.

The closest regulation of the chocolate at a constant temperature does not, however, effect satisfactory results. It is known that the temperature of the chocolate must vary from time to time during the day. For example, in starting the coating machine with the chocolate "frozen", or in a solid condition, it is necessary to apply a high temperature, say 110 to 120 degrees to quickly thaw the chocolate. If then, the chocolate is cooled down to normal dipping temperature, say about 90 degrees, it will be found poor in color but if it is cooled below 90 degrees, say to 87 degrees, the chocolate will have good color and can be immediately used at this temperature for a while for coating. If, however, the temperature is maintained very long at this figure, the chocolate begins to thicken up, due very likely to the continual stirring of the chocolate, and it is soon necessary to raise the temperature.

While the temperatures stated are illustrative and will vary somewhat with different conditions and different grades of chocolate, it is true that it is necessary to gradually raise the temperature after the coating machine has been started from a minimum to a maximum in order to keep the chocolate in proper condition. The addition of a substantial amount of new chocolate to the kettle will require a change in temperature, usually a reduction, and as above stated, temperature changes are necessary during the progress of the stirring operation, which tends to thicken up the chocolate. It will be appreciated therefore, that it would be extremely difficult to provide automatic means for regulating the temperature of the chocolate, which means would satisfactorily cope with conditions like those set forth and insure the maintenance of the chocolate at the desired condition at all times. As a result, the regulation of temperature is generally effected manually, the skill and experience of the operator being relied on to judge the condition of the chocolate and determine when temperature changes are required.

This invention is directed to the control of the chocolate conditioning means according to variations in the viscosity of the chocolate and is intended to automatically maintain the chocolate within close limits at a uniform viscosity regardless of temperature, thereby eliminating the necessity of skilled operatives and the reliance on personal judgment with consequent uncertainty as to the exact condition of the coating and probable nonuniformity in the coated product.

The invention may be carried out in various ways, as will readily occur to those skilled in the art, but, in its preferred form, variations in the viscosity of the chocolate are made to cause an operation of a valve, or valves, which regulate the admission of the temperature controlling medium into the jacket of the chocolate tank, and desirably also into the conduit through which the chocolate is delivered from said tank for coating purposes.

An important adjunctive feature of the invention consists in the use of a positive acting pump for forcing the chocolate from the tank through said conduit to the shower pan of the coating machine, or if the tank is to be used apart from the machine as a conditioning kettle, the pumped chocolate may return directly to the tank. This pump is desirably one which delivers measured volumes of chocolate at a uniform rate whereby, if the viscosity of the pumped material varies, the pressure will vary and the variation in pressure is made to effect an operation of the valve controlling the temperature regulating medium, in any suitable way, as through the medium of a pressure controller.

While the chocolate may act directly on the pressure controller, I prefer to secure the result indirectly, and it is another adjunctive feature of the invention to effect the result through the admission of a very small amount of compressed air into the conduit adjacent the pump. Such air finds its way through the chocolate and escapes but its rate of flow therethrough varies with the viscosity of the chocolate and, if the latter becomes thick, a pressure in the air admission pipe is built up which acts upon the pressure controller with the result above stated. Of course, this air does not necessarily have to be admitted into the conduit which conveys the chocolate to the shower pan,—although the amount of air admitted is so small as to seldom be objectionable,—for as above stated the conduit may lead directly back into the supply tank.

Other features and advantages will appear in the following description and will be pointed out in the appended claims.

The invention, in one illustrative embodiment, is shown in the accompanying drawings, in which:—

Fig. 1 is a cross sectional view of a known type of chocolate coating machine, taken on the line 1—1 of Fig. 3, and illustrating the application of my control apparatus thereto;

Fig. 2 is an enlarged view of the control apparatus, showing the detail; and

Fig. 3 is a sectional plan view of the coating machine showing the drive for the chocolate stirring and elevating means.

Referring to these drawings:—the invention has been shown by way of illustrative example, as applied to a chocolate coating machine of the general type shown in United States Letters Patent No. 1,323,948, granted December 2, 1919 on an invention of A. L. Bausman. That machine, in common with many others disclosed in the prior art, includes a supply tank 5 for the chocolate, or other coating, and coating conditioning means associated therewith. These conditioning means comprise a stirrer 6 and a heating jacket 7, by means of which the chocolate is kept thoroughly mixed and its temperature controlled, respectively. Chocolate from tank 5 is elevated, by any suitable means, such as the gear pump 8, through a conduit 9, which is also provided with a temperature controlling jacket 10, and the conduit 9 delivers the chocolate into a shower pan 11. The chocolate flows from pan 11 through a slot 12, provided in the bottom thereof, and descends upon and coats the candies, which are carried thereunderneath on a wire mesh conveyer 13, all in a manner too well known in the art to require further description here.

In the particular machine illustrated, the tank 5 is supported from the floor by a hollow pedestal 14 and a casing 15 is superimposed on the tank to house the coating and associated devices and through which the conveyer 13 travels. The machine is, or may be, substantially like that of said patent except that the location of pump 8 and its driving mechanism has been changed, such variation being shown by a comparison of Fig. 3 with Fig. 3 of the patent. The drive shaft 16 of pump 8 is connected by spur gears 17 to an electric motor 18. The pump includes intermeshing spur gears 19, one of which is fixed to shaft 16. The stirrer 6 is fixed to a vertical shaft 20, which extends through the base of tank 5 into the hollow pedestal 14 and carries a bevel gear 21. In mesh with the latter is a bevel pinion 22 which is fixed to a spur gear 23, the latter being driven by a pinion 23' fixed on shaft 16. The pump 8 is mounted vertically below tank 5 and is connected with the same by a pipe 24. The pump is likewise provided with a jacket 25 and this jacket also encompasses the major portion of its outlet pipe 26 which is connected to conduit 9 by a T 27.

Further description of the coating machine is thought unnecessary to an understanding of the invention, reference being made to the aforesaid patent for a more complete disclosure. The machine shown is merely illustrative of one of many machines of a like nature with which my invention may equally well be embodied.

Any suitable system may be employed for effecting temperature variations in the chocolate and I have chosen to illustrate one which is somewhat similar to those in common use. Steam and cold water are supplied by pipes 28 and 29, respectively, to a common pipe 30 which leads to the base of the jacket 25. The latter is connected by a pipe 31 to the base of jacket 10 and the upper portion of the latter is connected by a pipe 32 to the lower portion of jacket 7. The medium, admitted to pipe 30, circulates first around the outlet pipe 26 and pump 8 and then travels upwardly around conduit 9, thence passing to the jacket 7 of tank 5, from which it overflows through a pipe 33. A desirable feature of this system consists in passing the temperature changing medium to the jacket 10 before it is passed to the jacket 7 in order to first effect the temperature change in the chocolate which is very shortly to be delivered on the goods for coating. In this way the coating is conditioned properly almost immediately prior to its application to the candies which is most important and results in marked improvement in the quality and appearance of the coated candies.

In the steam pipe 28, a check valve 34 is provided to prevent return flow and desirably an ordinary throttle valve 35 is provided behind valve 34 for manual adjustment of the flow of steam. In practice, I use steam at a low pressure, say around two pounds. The water pressure is greater so that when water is admitted to pipe 29, the check valve 34 closes and shuts off the steam. Thus, water and steam are alternately admitted to the various jackets described. The admission of water to pipe 29 is controlled by a valve 36 which is pneumatically operated. This valve, as shown in Fig. 2, is normally held open by a spring 37 and the upper end of its stem lies adjacent a diaphragm 38. Compressed air is admitted through a pipe 39 to the closed space 40 above the diaphragm, whereby the valve is pressed downwardly against its seat to stop the flow of water through pipe 29. When such flow ceases, the steam pressure is sufficient to open check valve 34. Thus, the valves 34 and 36 work in alternation and both under the control of the diaphragm 38.

The admission of compressed air to pipe 39 is governed by a pressure controller represented generally by reference numeral 41. As shown in Fig. 2, this controller includes a ball valve 42 which functions to open, close or restrict communication between two passages 43 and 44. The latter is connected to pipe 39 and passage 43 is connected by a pipe 45 to a source of compressed air. It is usual to connect gages $g$ and $g'$ to the pipes 39 and 45, as indicated. The valve 42 may be moved toward its seat, or pressed thereagainst, through the agency of a plunger 46, which is slidably mounted in the member 47 containing the valve and associated passages. Also mounted on this member is a collapsible spring or bellows 48, the outer face of which moves toward or away from the rear face in response to variations in the pressure of fluid contained therein. A stud 49, screw threaded into a lever 50 is adapted to be engaged and moved by the bellows 48. Lever 50 is pivoted to member 47 at 51 and a spring 52 tends to move it in opposition to the bellows. The lever 50 operates to move plunger 46 inwardly and it is moved outwardly, when permitted, by air pressure acting on valve 42. Thus, valve 42 is moved away from its seat when pressure builds up in bellows 48 and toward its seat when pressure diminishes therein.

A squared end 53 on stud 49 permits adjustment of the latter with respect to the bellows, whereby the valve 42 may be made to respond to different pressures and thus, as will appear, to different viscosities of chocolate. By adjusting stud 49, the viscosity of the chocolate may be varied. The controller, which is of a type well known in the art usually includes a graduated dial 54 and a pointer 55 carried by stud 49 to indicate the setting of the same and thus, in a measure, to indicate in this case the degree of viscosity of chocolate which the controller is adapted to maintain.

The bellows 48 of the controller is connected by a pipe 57 to the T 27, entering the same opposite from the outlet 26 of pump 8. Surrounding pipe 57, adjacent its point of entrance to T 47, is a jacket 58 which is connected by a pipe 59 to steam pipe 28 at a point back of check valve 34, whereby steam at all times is conveyed to jacket 58 to keep the outlet end of pipe 57 from clogging with chocolate.

The varying pressures in the chocolate forced into outlet 26 by pump 8 could be communicated directly to bellows 48 but the pipes and bellows might fill with chocolate and clog. Therefore, I prefer to use a slightly different arrangement in which a check valve 60 is interposed in pipe 59 at a point closely adjacent jacket 58 to prevent the trouble described and the varying pressures in the chocolate are transmitted to the bellows through the intermediary of the air in pipe 57. This air is admitted into pipe 57 by a connection 61 with the air supply pipe 45 and I interpose in pipe 61 a valve 62. A gage 63 is connected to pipe 57 to indicate the pressure therein. The valve 62 allows only an exceedingly small amount of air to leak by it into pipe 57. Its adjustment may best be described by saying that it is a leaky valve for the flow permitted by it is less than that which would obtain if the valve were just "cracked". A very small nick in the valve seat will suffice to admit enough air when the valve is in tightly closed position. The admission of some air is necessary to build up a pressure against one side of check valve 60 to balance or overcome the pressure of the chocolate on the other side, as the case may be. Some of this air escapes through the chocolate into conduit 9 but its rate of escape will vary with the viscosity of the chocolate and, should the latter thicken up, less air will escape and pressure will build up in bellows 48 to cause a closing movement of valve 42 which in turn causes a closing off, or a restriction, of the cold water flow, thereby enabling the temperature of the chocolate to rise and its viscosity to be lessened. When the chocolate becomes less viscous, the pressure in bellows 48 will diminish and cold water will be admitted to cool the chocolate and thicken it up until it has the desired degree of viscosity.

In the practical use of the apparatus described, a pressure controller adapted for pressures from two ounces to five pounds is used which is very sensitive and the particular way, in which the controller bellows is connected to the chocolate conduit, is calculated to increase the sensitivity of the apparatus. Consequently, very slight changes in pressure of the pumped chocolate, induced by variations of the viscosity thereof, cause an operation of the controller and effect a change in the temperature in the various jackets. The result is that the chocolate can be automatically maintained in a substantially uniform condition at all times and substantially constant at any desired degree of viscosity. The apparatus has been proved commercially satisfactory by use in connection with a confection coating machine. The product of such machine is better in appearance and gloss and necessarily uniform due to the control according to viscosity. With this control one can readily run the chocolate at a comparatively heavy viscosity which is desirable because of its quick setting qualities but also because of the fact that the cocoa butter content does not separate as readily and remains mixed with the solid ingredients to impart a rich gloss to the coatings.

While the invention has been disclosed with particular reference to controlling the viscosity of chocolate it is obvious that the apparatus disclosed is equally well adapted for controlling the viscosity of other materials of a viscous nature. Accordingly, it is to be understood that the phrase "chocolate or the like" used in the appended claims is considered to cover chocolate and any other material, the viscosity of which can be controlled by the apparatus claimed.

The invention has been disclosed herein, in an embodiment at present preferred, for illustrative purposes but the scope of the invention is defined by the appended claims rather than by the foregoing description.

What I claim is:

1. The combination with a container of chocolate or the like, of means associated therewith to quickly increase the temperature of the chocolate, means associated with said container to quickly decrease the temperature of the chocolate, means responsive to variations in the viscosity of the chocolate to control the application of said heating and cooling means and arranged to effect the application of the same alternately, so that when the chocolate thickens up the heating medium is applied and when the chocolate becomes thinner the cooling medium is applied to cause a quick reduction in temperature of the chocolate, independently of such reduction as may be effected by the cessation of the application of the heating means.

2. The method of regulating the viscosity of chocolate and maintaining the same at substantially constant viscosity which consists in alternately applying thereto heating and cooling mediums, the respective temperatures of which are well above and well below the freezing point of chocolate, and in controlling the application of said mediums in accordance with variations in viscosity of said chocolate so that the cooling medium is applied if the viscosity of the chocolate decreases below a predetermined degree and the heating medium is applied if the viscosity of the chocolate increases above said degree.

3. The combination with a container of chocolate or the like, of a connection through which a small amount of compressed air is admitted into said chocolate, a pressure responsive element associated with said air supply connection, and means operable from said element for effecting a variation in the viscosity of the chocolate.

4. The combination with a container of chocolate or the like, temperature conditioning means therefor, of a connection through which a small amount of compressed air is admitted into said chocolate, a pressure responsive element associated with said air supply connection, and means operable from said element for effecting a variation in said conditioning means.

5. The combination with a conditioning tank for chocolate and the like, of a pump and a conduit through which the chocolate is forced by the pump, a conduit through which a regulated flow of compressed air is admitted to the chocolate conduit, a pressure controller connected to the air conduit and responsive to variations in pressure therein, and means operable by said controller to condition the chocolate and maintain it at substantially a uniform viscosity.

6. The combination with a conditioning tank for chocolate and the like, of a pump and a conduit through which the chocolate is forced by the pump, a conduit through which a regulated flow of compressed air is admitted to the chocolate conduit, a nonreturn valve in said air conduit adjacent said chocolate conduit, a pressure controller connected to the air conduit and responsive to variations in pressure therein, and means operable by said controller to condition the chocolate and maintain it at substantially a uniform viscosity.

7. The combination with a conditioning tank for chocolate and the like, of a pump and a conduit through which the chocolate is forced by the pump, a conduit through which a regulated flow of compressed air is admitted to the chocolate conduit, a nonreturn valve in said air conduit adjacent said chocolate conduit, means for heating the air conduit between said valve and chocolate conduit, a pressure controller connected to the air conduit and responsive to variations in pressure therein, and means operable by said controller to condition the chocolate and maintain it at substantially a uniform viscosity.

8. The combination in a chocolate coating machine having a conditioning tank for the chocolate, a conduit through which the chocolate is delivered for coating the goods, means for moving the chocolate through said conduit and jackets associated with the conduit and said tank, of means for admitting a temperature changing fluid to the conduit jacket and thence to the tank jacket, and means responsive to variations in the viscosity of the chocolate in said conduit to control said temperature changing means.

WILLIAM A. MOIR.